(12) United States Patent
Mildner et al.

(10) Patent No.: US 10,023,240 B2
(45) Date of Patent: Jul. 17, 2018

(54) MOTOR VEHICLE BODY WITH MULTI-SHELLED WHEELHOUSE

(71) Applicant: GM GLOBAL TECHNOLOGY OPERATIONS LLC, Detroit, MI (US)

(72) Inventors: Udo Mildner, Ruesselsheim (DE); Jose Sousa Dias, Ruesselsheim (DE); Lothar Teske, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/204,396

(22) Filed: Jul. 7, 2016

(65) Prior Publication Data

US 2017/0008570 A1    Jan. 12, 2017

(30) Foreign Application Priority Data

Jul. 7, 2015   (DE) .......................... 10 2015 008 728

(51) Int. Cl.
  *B62D 25/16*   (2006.01)
  *B62D 25/08*   (2006.01)
(52) U.S. Cl.
  CPC .......... *B62D 25/16* (2013.01); *B62D 25/088* (2013.01)
(58) Field of Classification Search
  CPC ....... B62D 25/088; B62D 25/16; B62D 25/18
  See application file for complete search history.

(56) References Cited

U.S. PATENT DOCUMENTS

| 2,709,106 | A | 5/1955 | Vahey |
| 5,536,035 | A | 7/1996 | Bautz et al. |
| 9,616,937 | B2 * | 4/2017 | Sasaki .................. B62D 25/088 |
| 2012/0242111 | A1 | 9/2012 | Mildner et al. |
| 2016/0068190 | A1 | 3/2016 | Muehlhausen et al. |

FOREIGN PATENT DOCUMENTS

| DE | 102013014704 A1 | 3/2015 |
| DE | 102014104838 A1 | 10/2015 |
| JP | H0826138 A | 1/1996 |
| JP | H0995262 A | 4/1997 |

OTHER PUBLICATIONS

German Patent Office, German Search Report for German Application No. 102015008728.2, dated Jan. 29, 2016.
Intellectual Property Office, Search Report for United Kingdom Patent Application No. GB1610067.9 dated Nov. 30, 2016.

* cited by examiner

*Primary Examiner* — D Glenn Dayoan
*Assistant Examiner* — Melissa A Black
(74) *Attorney, Agent, or Firm* — Lorenz & Kopf, LLP

(57) ABSTRACT

A motor vehicle body includes a side member and with an at least two-shell wheelhouse supported against the latter. An upper wheelhouse shell and a lower wheelhouse shell at least regionally overlap each other and are joined together. Each wheelhouse shell exhibits a passage opening for arranging a strut mount toward the top in the vehicle vertical direction.

19 Claims, 8 Drawing Sheets

A-A

B-B

C-C

MOTOR VEHICLE BODY WITH MULTI-SHELLED WHEELHOUSE

CROSS-REFERENCE TO RELATED APPLICATION

This application claims priority to German Patent Application No. 102015008728.2, filed Jul. 7, 2015, which is incorporated herein by reference in its entirety.

TECHNICAL FIELD

The present disclosure pertains to an aspect of a motor vehicle body with a side member and with a wheelhouse supported against the latter for attaching a strut mount. Also provided is a motor vehicle with such a motor vehicle body.

BACKGROUND

Strut mounts provided on the body side are used to accommodate and attach a strut of a motor vehicle chassis, and hence to introduce and relay the forces acting on the body or chassis. As a consequence, they establish a connection between the strut and self-supporting body.

The requirements placed on the durability, strength, structural and torsional stiffness of a motor vehicle body are especially strict in the area of a strut mount. In order to provide enough stability, common strut mounts are fastened to a bulkhead plate that protrudes toward the front from an end wall of the motor vehicle body in the traveling direction of the motor vehicle. Such a bulkhead plate is located in front of the end wall in relation to the traveling direction of the motor vehicle, and essentially extends in the motor vehicle transverse direction (y).

Other embodiments provide for the use of a strut brace, which is joined with both strut mounts provided on the exterior sides of the motor vehicle body, and to this extent enable a reciprocal support of the two strut mounts in the vehicle transverse direction (y).

For example, a strut mount is described in DE 10 2009 032 602 A1. The strut mount here has a two-part design and includes an upper reinforcing part and a lower part of the strut mount. The lower part of the strut mount is here welded with a sheet metal structure of the wheelhouse shell, and the upper reinforcing part is welded with an inner wheelhouse brace.

Both new and alternative engine and transmission systems must be provided for new vehicle concepts, in particular for urban motor vehicles, which are designed and conceived for the inner-city transport of two to at most four people. Such motor vehicles are configured to have as compact and light a design as possible, so as to reduce fuel consumption or expand the range of purely electrically driven vehicles. Such vehicles are provided with comparably short front overhangs, which require that the engine and transmission be partially arranged underneath the vehicle end wall or center tunnel. For service reasons, body-side transverse structures cannot be realized in front of the vehicle end wall.

In such a construction, it is no longer possible to structurally fasten a strut mount to be located in the area of a wheelhouse to the end wall or to a bulkhead plate placed upstream from the end wall in the traveling direction. For weight reasons, consideration cannot be given to using a separate strut brace for joining the opposing strut mounts or strut domes.

SUMMARY

In accordance with the present disclosure, an improved wheelhouse and an improved structural attachment of a strut mount to the wheelhouse are provided, wherein the respective spring mounts to be provided to the left and right in the motor vehicle require no direct attachment or direct support in the vehicle transverse direction on other load-carrying body components. As a result, lower-weight and compact motor vehicle body may be achieved, which still is distinguished by an especially high level of durability, strength as well as structural and torsional stiffness in the area of a strut mount.

Provided in this regard is a motor vehicle body, which exhibits at least one side member and at least two-shell wheelhouse supported against the latter. The wheelhouse here exhibits an upper wheelhouse shell and a lower wheelhouse shell. The latter at least regionally overlap each other, and are further joined together. Toward the top in the vehicle vertical direction (z), the upper and lower wheelhouse shells each exhibit a passage opening for a strut mount. The at least two-shell wheelhouse is dual-material in design, so to speak. The upper wheelhouse shell here serves as an inner shell that directly adjoins the engine compartment, while the lower wheelhouse can also be referred to as the outer wheelhouse shell. The latter can be designed as a constituent of a wheelhouse whose outer or lower side directly faces a wheel of the motor vehicle.

The regionally overlapping or covering arrangement of two wheelhouse shells can be used to achieve a quasi-two-shear attachment of the strut mount. To this extent, the two wheelhouse shells can act as separate tie rods, so that the forces introduced into the motor vehicle body via the strut mount can be especially well absorbed or diverted into adjoining load-carrying structural components of the motor vehicle body. Forces introduced into the body via the strut mount can be distributed to the two shells of the wheelhouse, and thereby be introduced into the body via at least two load paths.

The two-shell and extensively overlapping arrangement of the upper and lower wheelhouse shell increases the lateral or transverse stiffness of the strut mount, as well as its structural attachment to the wheelhouse, thus eliminating the need for a separate transverse or lateral support provided by an additional component, for example by a bulkhead plate, an end wall water tank or by a strut brace that joins the two strut mounts together. In the final analysis, a reduction in weight can be achieved despite the two-shell configuration. The two shells can each exhibit a smaller material thickness than the material thickness given a single-shell configuration of the wheelhouse.

In another embodiment, the motor vehicle body further exhibits a strut mount, which has a pot section that projects upwardly in the vehicle vertical direction (z) and a flange that envelops the pot section. The flange here is typically located at a base point, i.e., at an end of the dome or cup-shaped pot section lying below in the vehicle vertical direction. The strut mount intersects both passage openings, which come to lie flush one over the other, from the lower and upper wheelhouse shell from below.

In this way, the forces transferred by the chassis via the damper or strut to the strut mount and acting upwardly in the vehicle vertical direction can be conveyed to the wheelhouse as tensile forces. Corresponding forces that act upwardly or also in the longitudinal or transverse direction can be conveyed into the motor vehicle body particularly effectively by reciprocally supporting the pot section on the opening edge, or by reciprocally supporting the flange of the strut mount on the wheelhouse.

The requirements placed on the attachment for reciprocally attaching the strut mounts to the wheelhouse can be lowered by having the pot section of the strut mount intersect the two passage openings from the upper and lower wheelhouse shell from below, and by having the strut mount be supported from below against the wheelhouse and held against it accordingly. The attachment to be provided between the strut mount and wheelhouse, for example in the form of welded joints, lie outside of the primary load path between the strut mount and wheelhouse.

In a further development, the passage openings of the upper and lower wheelhouse shell are each provided with a respective opening edge designed like a flange and protruding upwardly in the vehicle vertical direction. On the one hand, an upwardly protruding opening edge results in a stiffening and structural reinforcement of both the upper and lower wheelhouse shell. In addition, the flanged configuration of the opening edges makes it possible to provide a defined reciprocal support and attachment surface for the upper and lower wheelhouse shell via structural attachment with the strut mount.

The opening edges of the upper and lower wheelhouse shell can also directly adjoin each other, and be structurally joined together. The two opening edges are preferably each continuous and closed in design such that the passage openings of the upper and lower wheelhouse shell are each located spaced apart from the outer edges of the upper and lower wheelhouse shell.

In this respect, the area of the upper and lower wheelhouse shell that comes into direct contact with the strut mount, and thus the two-shell wheelhouse formed as a result, can be structurally reinforced, so that the forces diverted into the wheelhouse via the strut mount can be transmitted especially well. The structural connection between the upper and lower wheelhouse shells in the area of the opening edges established by the strut mount also leads to an improved durability and structural stiffness of the wheelhouse and its connection to the strut mount.

It is further provided that the opening edges of the respective passage openings projecting upwardly on the two wheelhouse shells exhibit roughly the same angle of inclination as the pot section of the strut mount, so that the opening edges, or at least the opening edge of the lower wheelhouse shell, can be reciprocally supported over as much of the surface of the pot section of the strut mount as possible.

In another embodiment, the strut mount with its flange and/or with its pot section abuts against a lower side of the lower wheelhouse shell. In particular, it is also structurally joined with the lower side of the lower wheelhouse shell. It is here provided in particular that the exterior side of the pot section abut against a lower side or interior side of the opening edge of the lower wheelhouse shell, and be structurally joined thereto.

Alternatively or additionally thereto, it can be provided that the flange of the strut mount that envelops a base point of the pot section abut against the lower side of the lower wheelhouse shell. The flange of the strut mount here typically lies directly adjacent to the passage opening of the lower wheelhouse. The position in which the flange or pot section is reciprocally supported on the opening edge or on the lower side of the lower wheelhouse shell typically extends over largely the entire surface or continuously in the peripheral direction, making it possible to achieve the largest possible reciprocal contact surface, and a correspondingly stable reciprocal support for the strut mount and lower wheelhouse shell.

In another embodiment, the upper and lower wheelhouse shells each exhibit a curvature corresponding to the wheel well contour. The upper and lower wheelhouse shells are here structurally joined together, forming at least one hollow space bordered by the respective curvatures. The hollow space formed between the upper and lower wheelhouse shells need not be bordered exclusively by the curvatures of the wheelhouse shells. In particular, it is conceivable that several hollow spaces or hollow space sections also be sealed by arranging the wheelhouse shells on adjoining support structure components of the motor vehicle body, for example through fastening to the side member or fastening to a wheelhouse brace.

The formation of at least one hollow space between the curvatures of the upper and lower wheelhouse shell leads to a further structural reinforcement of the wheelhouse. Directly joining the upper and lower wheelhouse shells and/or fastening and attaching the wheelhouse shells to adjoining support structure components of the motor vehicle body generates a hollow chamber profile between the wheelhouse shells, in particular between their curvatures, making it possible to improve the structural stiffness, torsional stiffness, strength and durability of the wheelhouse, as well as its connection to the strut mount, which preferably has a single-piece design.

In another embodiment, the upper and lower wheelhouse shells extend upwardly in the vehicle vertical direction from the respective side member and outwardly in the vehicle transverse direction until bordering a wheelhouse brace. Both the upper and lower wheelhouse shells are here arranged separately, both with the side member and with the wheelhouse brace that runs above and outwardly offset to the side member relative to the vehicle transverse direction (y). In particular, they are structurally joined with both the side member and wheelhouse brace. Each of the two wheelhouse shells extends as a single piece between the side member and wheelhouse brace.

Both the upper and lower wheelhouse shell extend as a single piece from the side member, upwardly and outwardly toward the wheelhouse brace. To this extent, an especially strong load-transferring connecting structure can be established between the wheelhouse and the two other support structure components of the motor vehicle body that typically extend in the vehicle longitudinal direction, specifically the side member and wheelhouse brace. The respective strut mount is attached to the wheelhouse spaced apart from both the side member and wheelhouse brace. The double-shell structure of the wheelhouse, in particular the separate attachment of both the upper and lower wheelhouse shell to the respective side member and to the wheelhouse brace, makes it possible to provide an especially good, durable, as well as structurally and torsionally stiff load-transferring connection for the strut mount to the support structure components of the motor vehicle body.

In another embodiment, the lower wheelhouse shell is joined with an exterior side of the side member lying outside in the vehicle transverse direction. In this regard, the lower wheelhouse shell can only exhibit a lower edge section that extends quasi parallel to the curvature or continues it along a straight line, and to this extent can abut in a planar manner against the outlying exterior side of the side member, and there be structurally joined with the side member. In this way, the wheelhouse is supported against the side member over the lower wheelhouse shell to the outside in the vehicle transverse direction (y).

In another embodiment, the upper wheelhouse shell is joined with an upper side of the side member lying at the top in the vehicle vertical direction, in particular structurally joined thereto. As a consequence, the wheelhouse is supported against the side member lying at the bottom in the vehicle vertical direction via the upper wheelhouse shell. In light of this and due to their respective fastening to the side member, the upper wheelhouse shell and lower wheelhouse shell can divert predominantly vertically running or horizontally running forces into the side member.

In addition, fastening to the side member at the top and to the side makes it possible to achieve a further structural reinforcement and stiffening of the wheelhouse. In particular, a closed hollow profile can be formed adjacent to the side member by the side member itself, by the lower wheelhouse shell, as well as by the upper wheelhouse shell, and used to further improve the structural stiffness.

In another embodiment, end sections of the upper and lower wheelhouse shells lying to the front or back in relation to the vehicle longitudinal direction are at least sectionally joined together directly adjacently and structurally. In this way, the wheelhouse can be further reinforced and stiffened. The upper and lower wheelhouse shells can be structurally joined together repeatedly via the aforesaid end or edge sections, as a result of which an especially structurally reinforced and stiff reciprocal connection can be established between the upper and lower wheelhouse shells. In particular, it is conceivable for the upper and lower wheelhouse shells to be structurally joined together almost completely along both their edges lying to the front in the traveling direction and along their edges lying to the back in the traveling direction.

In the present context, a structural connection is to be understood as any connection suitable for the mechanical load transfer of two components. This can be realized in a variety of ways. For example, structural connections can be generated via spot welding, laser welding, bonding, bolting, riveting or clinching.

In another embodiment, the upper wheelhouse she exhibits a depression in the area of its curvature that extends in the direction toward the lower wheelhouse shell. The depression is here joined with the lower wheelhouse shell, in particular structurally connected thereto. The depression, which can also be designed as a bead, is used to again separately connect the curvature of the upper wheelhouse shell, which comes to lie predominantly spaced apart from the curvature of the lower wheelhouse shell, with the lower wheelhouse shell.

In particular, the depression can be provided spaced apart from edge sections of the upper wheelhouse shell lying to the front or back. It is conceivable in particular for the depression to adjoin the side member, for example, and thus be formed in the lower section of the upper wheelhouse shell, and be located roughly centrally on the upper wheelhouse shell in relation to the vehicle longitudinal direction.

Similarly thereto, the lower wheelhouse shell can in another embodiment also exhibit a projection extending in the direction toward the upper wheelhouse shell in the area of its curvature. The latter can also be joined with the upper wheelhouse shell, in particular structurally connected thereto. In particular, it is here conceivable for the depression of the upper wheelhouse shell to be joined with the projection of the lower wheelhouse shell, so that the upper and lower wheelhouse shells support each other quasi only in the area of depressions and projections that correspond with each other. The respective depression or projection can further help improve the stiffness of the respective curvature of the upper or lower wheelhouse shell. For example, both the depression and projection can take the form of an embossed metal sheet, which includes the upper or lower wheelhouse shell.

As a result of the overlapping arrangement and mutually corresponding configuration of the depression and projection, only comparatively shallow embossed depths must be introduced into the upper or lower wheelhouse shell to achieve a reciprocal support between the upper and lower wheelhouse shells while retaining a comparatively large distance. In this respect, the aforesaid embossing in the area of the depression or in the area of the projection leads to virtually no appreciable weakening of the material of the upper or lower wheelhouse shell.

In another embodiment, the motor vehicle body also has a rear wheelhouse shell. which is either designed as a single piece with the lower wheelhouse shell, or is structurally joined with a terminal section of the lower wheelhouse shell lying toward the back in relation to the traveling direction (R) of the motor vehicle. Toward the front in the traveling direction, the rear wheelhouse shell can exhibit a fastening or attaching edge, which can be structurally connected in an overlapping manner with the rearward lying terminal section, or with a corresponding fastening edge of the wheelhouse shell.

In this respect, the rear wheelhouse shell represents an elongation of the lower wheelhouse shell oriented in the vehicle longitudinal direction, which directly adjoins a wheel well or at least regionally includes a wheel well immediately facing the vehicle wheel. The rear wheelhouse shell can help to further structurally reinforce the multi-shell wheelhouse. in particular, the rear wheelhouse shell can provide the lower wheelhouse shell with reinforcement and support in the vehicle longitudinal direction against adjoining components of the motor vehicle body.

In another embodiment hereof, the motor vehicle body further exhibits a front wall that extends in the vehicle transverse direction and in the vehicle vertical direction. The latter typically separates the motor vehicle interior from the engine compartment lying in front of it in the traveling direction. The rear wheelhouse shell is here further supported against this front wall in the vehicle longitudinal direction (x). The upper wheelhouse shell is also supported against the front wall in the vehicle longitudinal direction via a flange lying toward the rear in the traveling direction (R). In this respect, the rear wheelhouse shell functions not only as an integral component and constituent of a wheelhouse, but rather also helps to reinforce the stability of the wheelhouse. The direct and twofold support, specifically of the upper and rear wheelhouse shell against the front wall, yields an improved force transfer between the wheelhouse, strut mount and other load-carrying structural components of the motor vehicle body.

In another aspect, the present disclosure provides a motor vehicle with a motor vehicle body described above.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
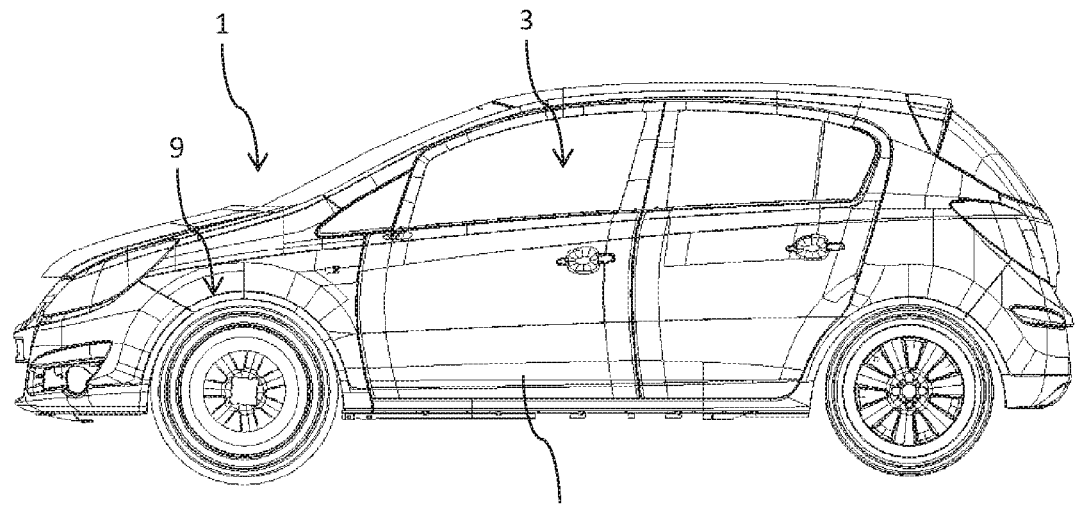
FIG. 1 is a schematic side view of a motor vehicle.

The motor vehicle 1 schematically shown on FIG. 1 is designed as a passenger car. It exhibits a self-supporting motor vehicle body 2 having an interior 3 that functions as a passenger compartment for the passengers. Shown in the depiction according to FIG. 1 at the left front of the motor vehicle 1 is a wheel well or a wheel well contour 9, which forms an envelope for the front left wheel of the motor vehicle 1.

Figure 5:
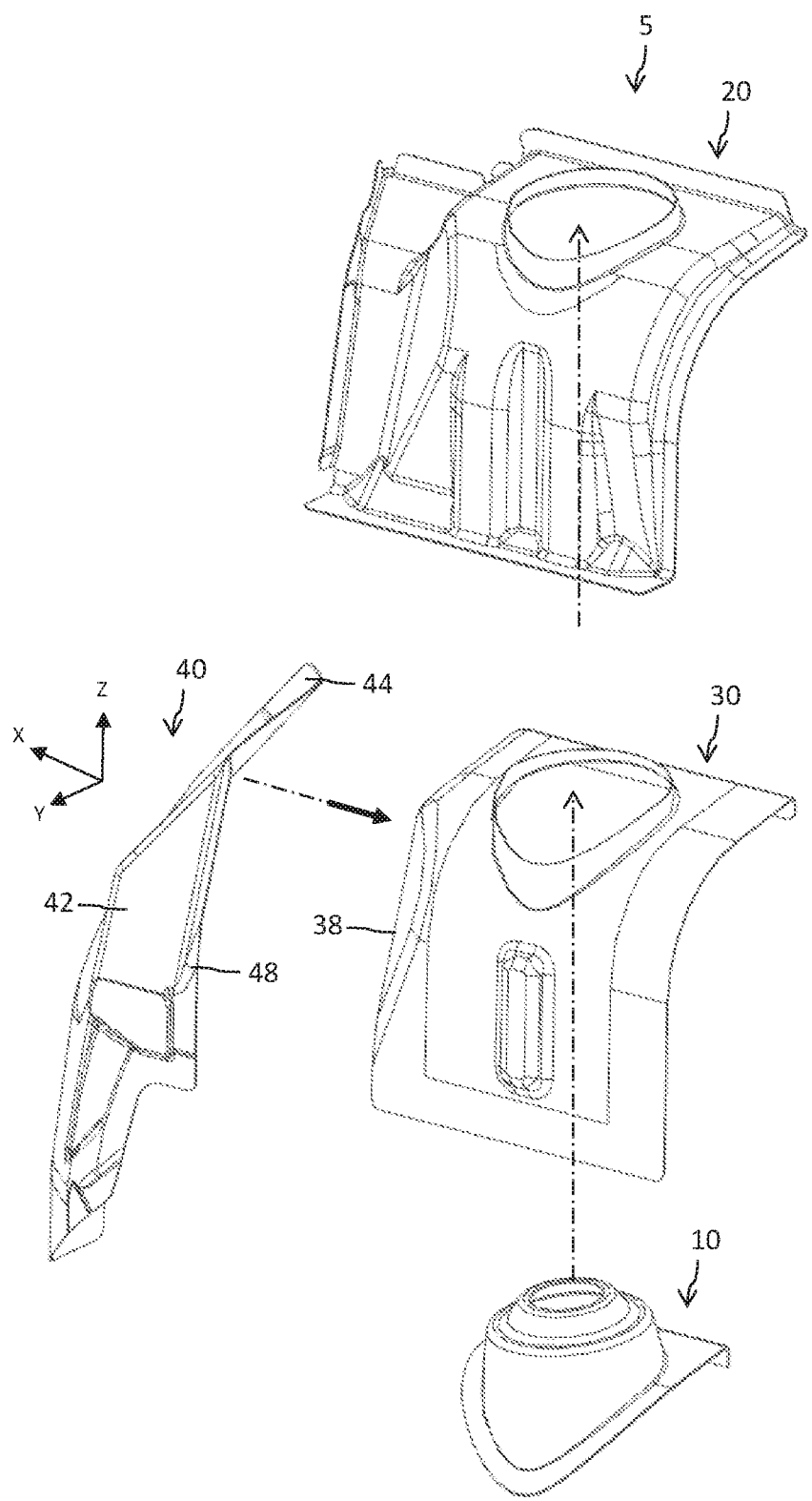
FIG. 5 is an exploded view of the upper, lower and rear wheelhouse shell and the strut mount.
Figure 6:
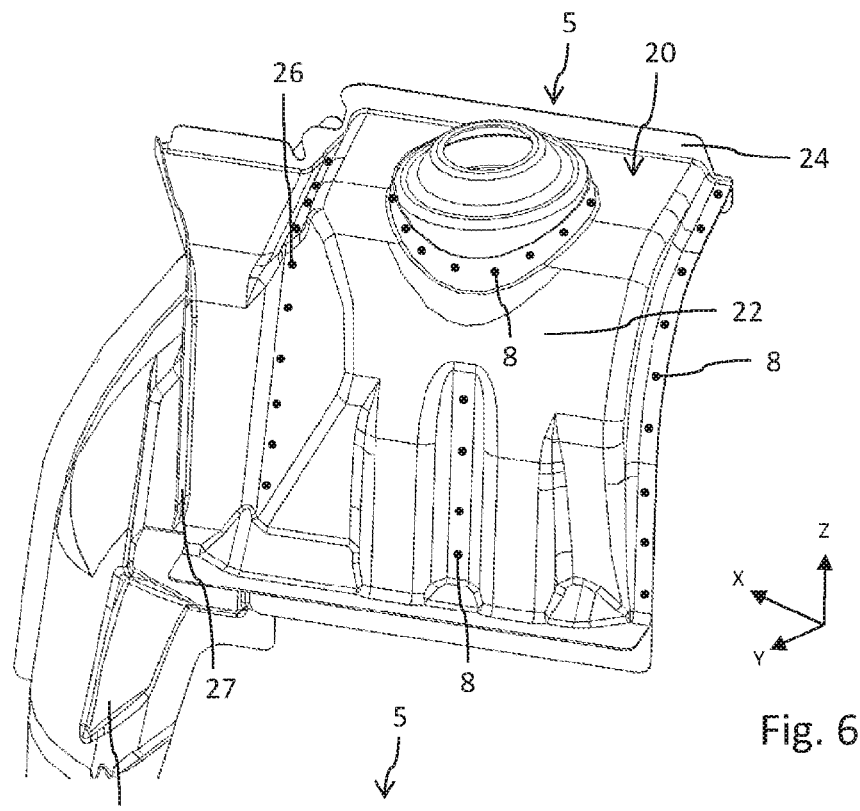
FIG. 6 is a perspective view of a wheelhouse consisting of the components depicted on FIG. 5.

The motor vehicle body 2 is further provided with a wheelhouse 5 depicted on FIGS. 5 and 6. The latter here exhibits an upper wheelhouse shell 20 and a lower wheelhouse shell 30, which can be arranged relative to each other so as to predominantly cover the surface according to the illustration on FIG. 5, and form a two-shell wheelhouse 5 in their reciprocally assembled position, as shown on FIG. 6. The wheel well 5 can optionally further be provided with a rear wheelhouse shell 40, which can be structurally joined with the lower wheelhouse shell 30. In an alternative embodiment not shown, it is further conceivable for the rear wheelhouse shell 40 and lower wheelhouse shell 30 to exhibit a single-piece design.

Figure 2:
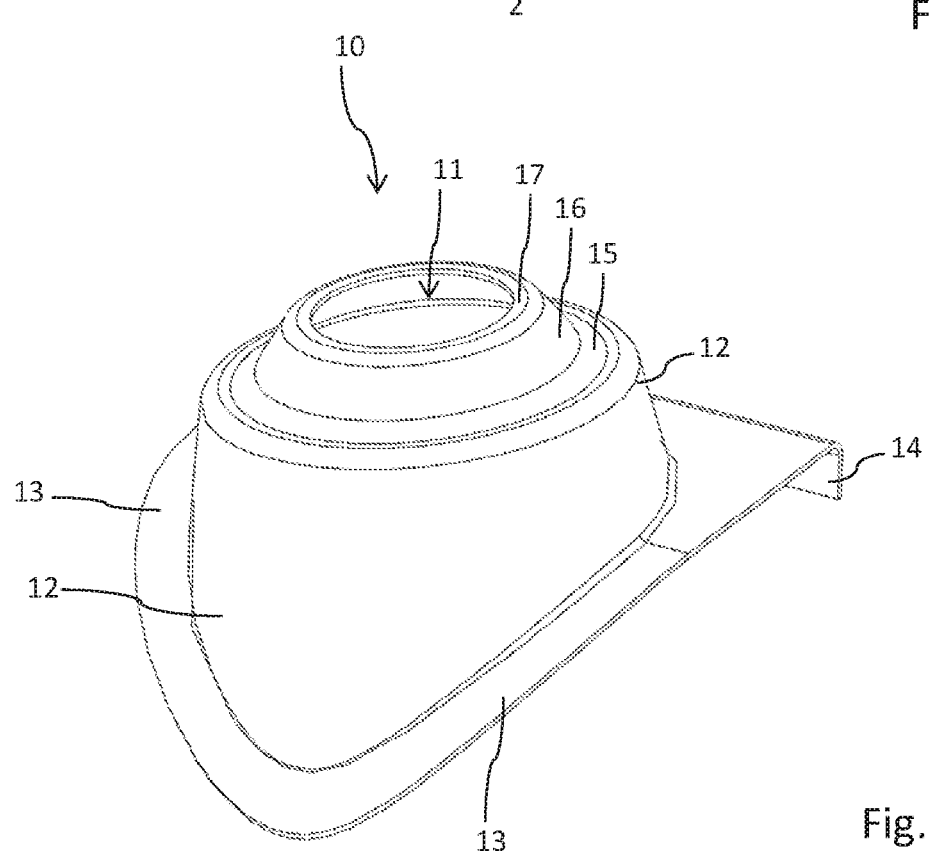
FIG. 2 is an isolated, perspective view of a pot-shaped strut mount.

The motor vehicle body 2 further exhibits a strut mount 10 depicted in isolation on FIG. 2. The strut mount 10 exhibits a pot- or dome-shaped pot section 12 which projects upwardly from a continuous flange section 13 in the vehicle vertical direction (z) relative to the subsequent final assembly in the motor vehicle. Viewed toward the top, the pot section 12 empties into a radially inwardly recessed floor 15 that extends inwardly, much like a flange. An upwardly oriented, continuous cone surface 16 extends from the latter, and once again empties into an inwardly projecting flange 17. This flange 17 lying at the top simultaneously acts as an opening edge of a passage opening 11 of the strut mount 10. The strut of a wheel suspension not shown here or a corresponding damper can be placed in the pot section 12.

The flange section 13 at the lower end of the pot section 12 surrounds the cup-shaped pot section 12 completely in the peripheral direction. The flange section 13 outwardly transitions into a downwardly recessed folded edge 14 in the vehicle transverse direction (y). As depicted in cross section on FIG. 9, this folded edge 14 can be used to support the strut mount 10 in the vehicle transverse direction (y) on a wheelhouse brace 50 that rims essentially horizontally and in the vehicle longitudinal direction, in particular on an inner wheelhouse brace 51, and can there also be structurally joined with the latter. The various connecting points 8 between the diverse body components are designed roughly as point welds in the present exemplary embodiment.

Figure 3:
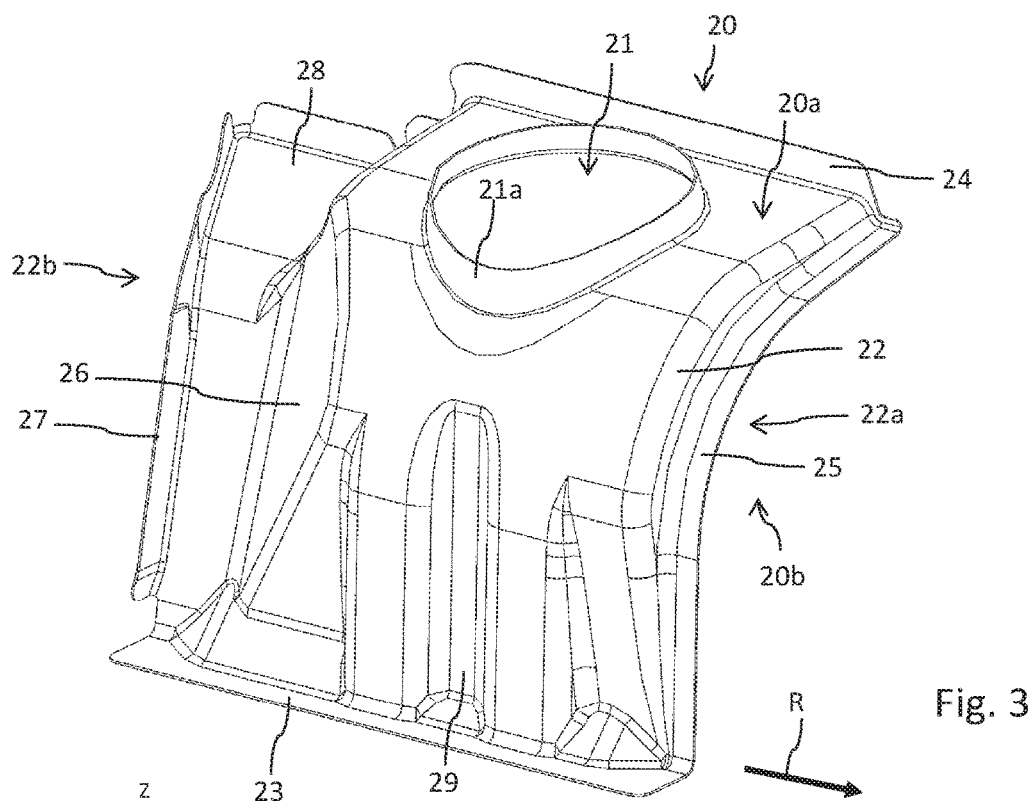
FIG. 3 is an isolated and perspective view of an upper wheelhouse shell.
Figure 9:
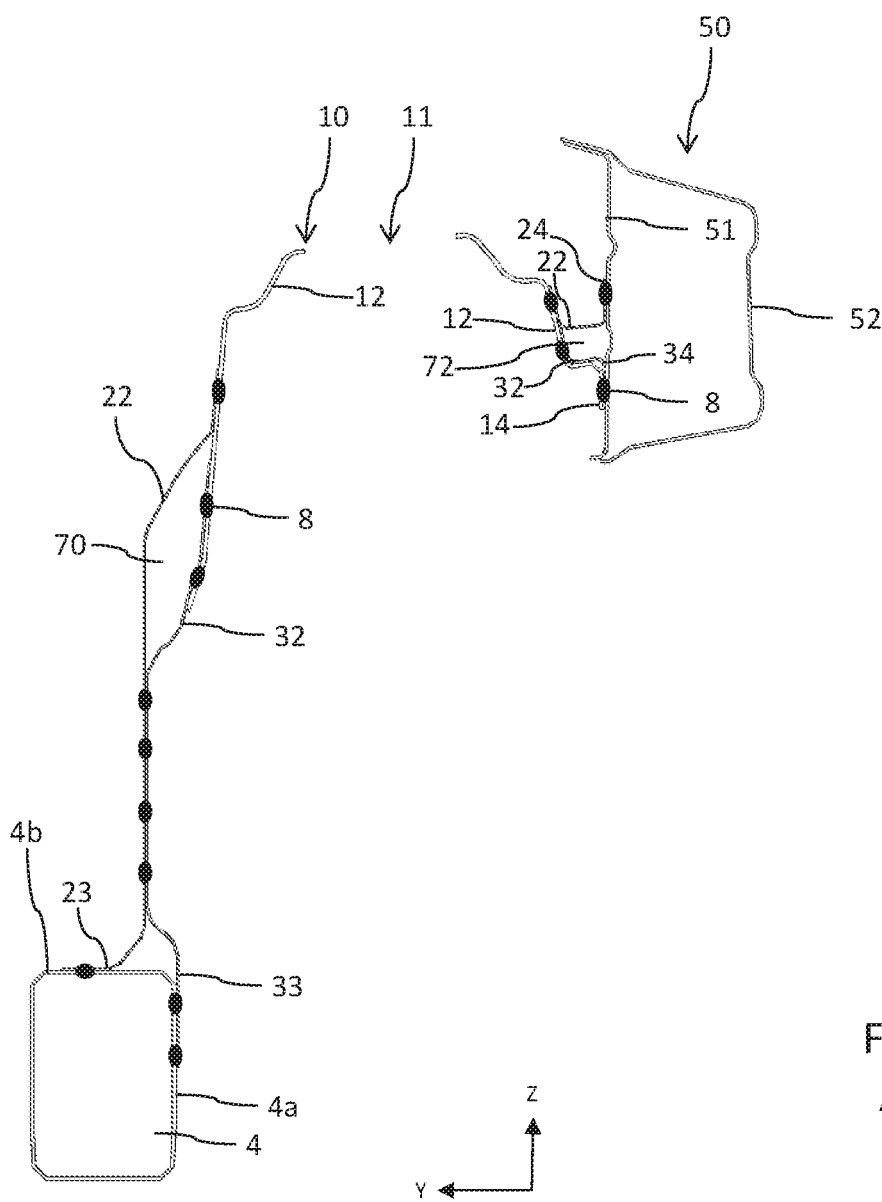
FIG. 9 is a cross section along A-A on FIG. 8.
Figure 10:
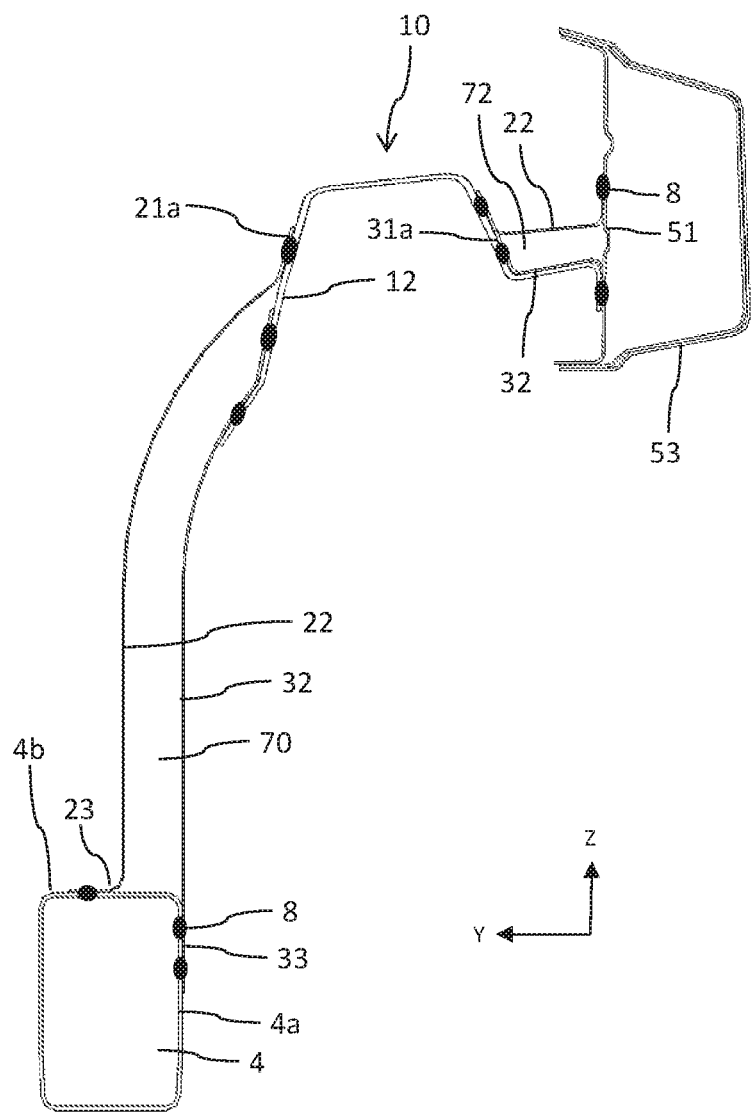
FIG. 10 is a cross section B-B on FIG. 8.

The upper wheelhouse shell 20 shown in isolation on FIG. 3 exhibits a passage opening 21 as well as a curvature 22, which in the finally assembled configuration is supported on the motor vehicle body 2, in the vehicle transverse direction (y) on the wheelhouse brace 50, there on the inner wheelhouse brace 51 and in the vehicle vertical direction, as also depicted on FIG. 9, on the lowermost side member 4. The lower wheelhouse shell 30 exhibits a progression similar or congruent thereto.

It also has a passage opening 31, which in the assembled position comes to overlap the passage opening 21 of the upper wheelhouse shell. The passage opening 21 exhibits an upwardly recessed, continuous opening edge 21a. The same also holds true for the opening edge 31a of the lower wheelhouse shell 30. In the assembled configuration, the respective opening edges 21a, 31a abut each other over nearly the entire surface. As shown on FIG. 6, they are structurally joined together by several connecting points 8.

The inclination of the opening edges 21a, 31a corresponds to the progression and inclination or geometry of the upwardly projecting pot section 12 of the strut mount 10. In this way, a comparatively large reciprocal contact surface is created between the strut mount 10 and wheelhouse shells 20, 30, which results in a further reciprocal structural reinforcement of the assembly of the upper wheelhouse shell 20, lower wheelhouse shell 30 and strut mount 10.

As evident from a combined review of FIGS. 3 and 9, the upper wheelhouse shell 20 is supported against an upper side 4b of the side member 4 by a flange 23, which inwardly projects toward the middle of the vehicle and is formed at the lower end of the curvature 22. By contrast, a flange 33 formed at the lower end of the lower wheelhouse shell 30, and hence a lower side edge 33, comes to abut against an exterior side 4a of the side member 4 in the vehicle transverse direction (y).

According to FIG. 9, diverse respective connecting points 8 are provided at the respective contact points of the upper wheelhouse shell 20 and lower wheelhouse shell 30. As further evident from the depiction on FIG. 9, the upper wheelhouse shell 20 and lower wheelhouse shell 30 are also structurally joined together, with the formation of a hollow space 70 in the area of their connecting flange sections 26, 36 facing away from a traveling direction (R). The upper and lower wheelhouse shells 20, 30 abut each other in the area of the connecting flange sections 26, 36 over nearly their entire extension between the side member 4 and wheelhouse brace 50.

In this respect, end sections 22b, 32b of the upper wheelhouse shell 20 or lower wheelhouse shell 30 lying to the rear in relation to the traveling direction (R) are structurally joined together. The same also holds true for the opposing end sections 22a, 32a lying to the front in the traveling direction (R). As evident from the depiction on FIGS. 2 and 3, the curvature 32 of the lower wheelhouse shell 30 exhibits an end section 35 lying to the front in the traveling direction (R), which extends from the lower flange 33 until up to an upper, but vertically downwardly protruding flange 34, which can be used to structurally join the lower wheelhouse shell 30 with the inner wheelhouse brace 51.

Congruently thereto, the entire front end section 22a of the upper wheelhouse shell exhibits a flange 25 that follows the contour of the edge 35, so that, in a finally assembled position according to FIG. 6, the front end sections 22a, 32a that come to overlap each other are structurally joined together via several connecting points 8 over nearly their entire extension from the side member 4 up to the wheelhouse brace 50. Let it be noted strictly by way of example at this juncture that continuous connections between the individual components can be provided in place of the several spaced apart connecting points.

The longitudinal extension, i.e., the extension in the vehicle longitudinal direction (x) of the upper wheelhouse shell 20, can be somewhat larger than that of the lower wheelhouse shell 30. The present exemplary embodiment already provides that the lower wheelhouse shell 30 be structurally joined with a terminal section 48 of the rear wheelhouse shell 40 by its rearward terminal section 38 forming a rear end section 32*b*. The rear wheelhouse shell 40 also exhibits a curvature 42, which together with the curvature 32 of the lower wheelhouse shell 30 forms the wheel well contour 9 visible from the outside.

Figure 7:
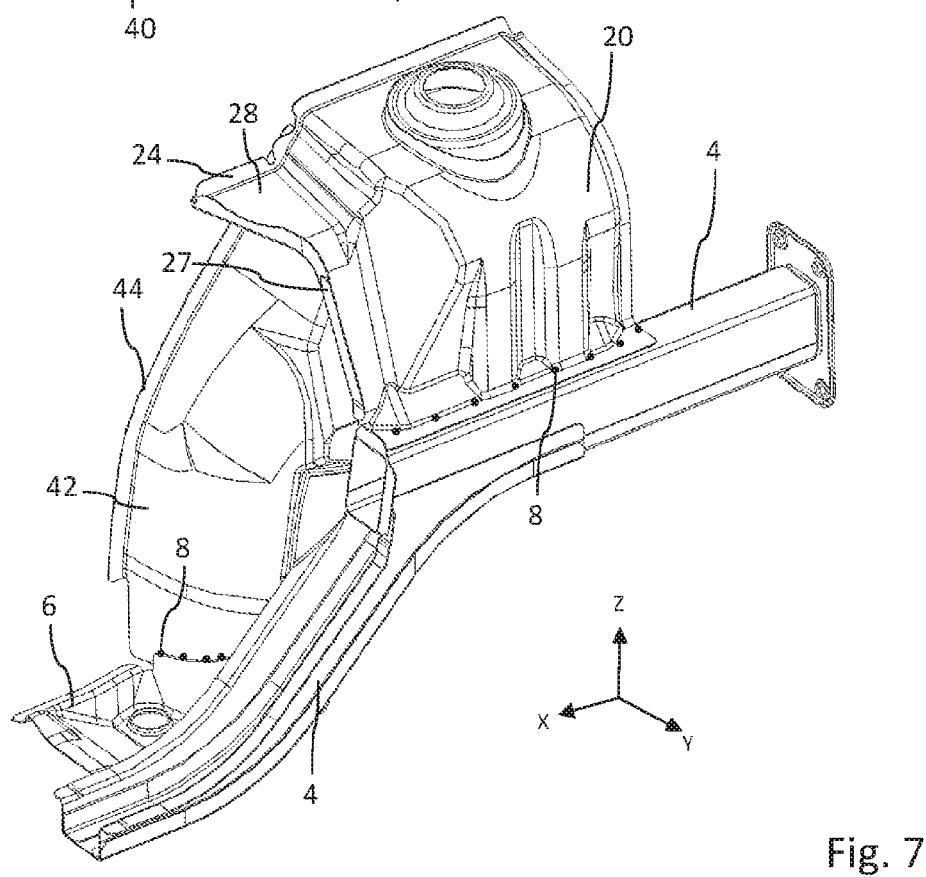
FIG. 7 is another view of the wheelhouse depicted on FIG. 6 in its position assembled to the side member of the motor vehicle body.
Figure 8:
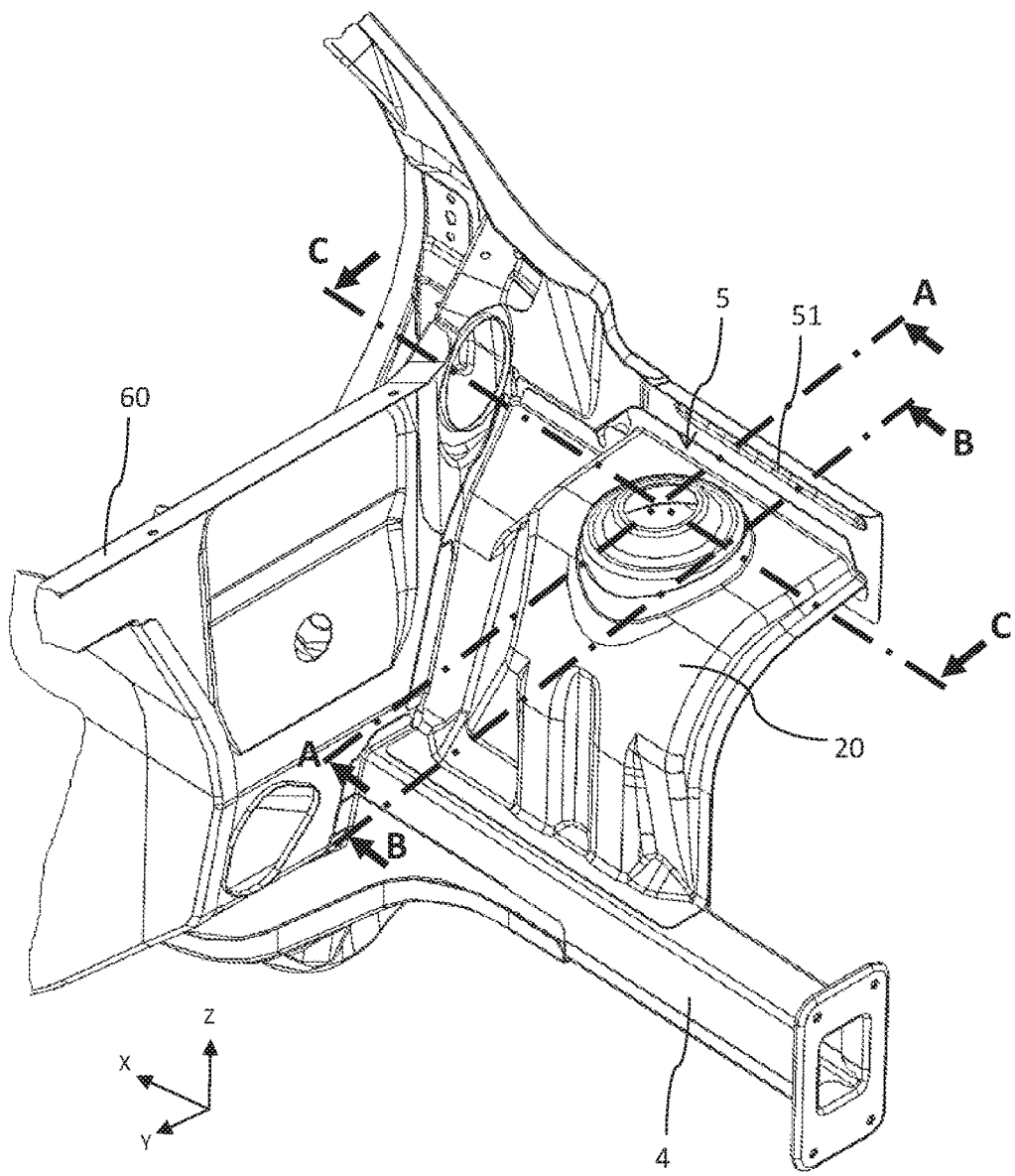
FIG. 8 is another perspective view of the wheelhouse and the side member, further combined with a front wall.

A lower end of the rear wheelhouse shell 40 is supported on the side member 4 via a transverse reinforcement 6, as evident from the depiction on FIG. 7. The end of the rear wheelhouse shell 40 lying to the outside in the vehicle transverse direction (y) exhibits an upwardly recessed flange 44 for supporting the rear wheelhouse shell 40 on the wheelhouse brace 50 in the vehicle transverse direction, and along which the wheelhouse brace 50 and rear wheelhouse shell 40 can be structurally joined together.

Figure 11:
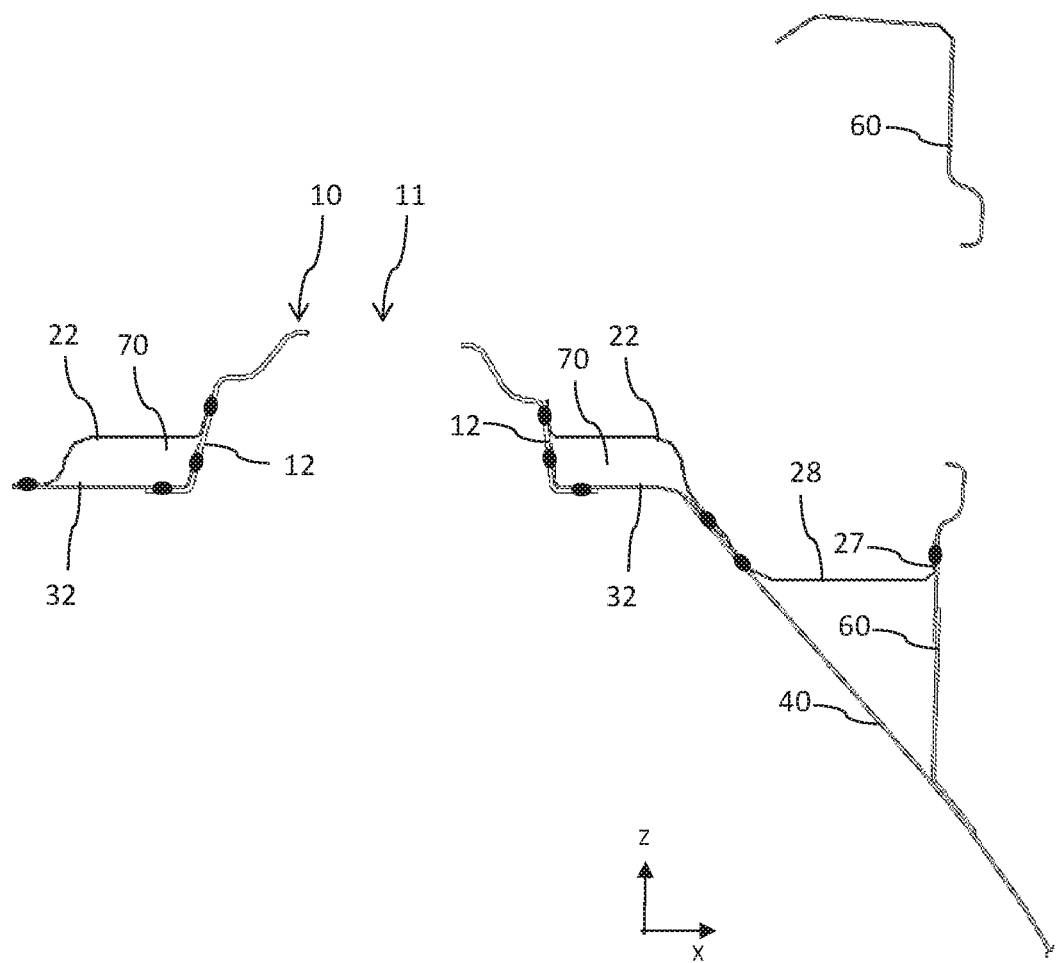
FIG. 11 is a cross section C-C on FIG. 8.

In addition, the rear wheelhouse shell 40 can receive a structural support on the front wall 60, as may be gleaned from FIG. 11. The rear end section 22*b* of the upper wheelhouse shell 20 can exhibit an extension 28 that extends essentially horizontal from the lower wheelhouse shell 30 or from the rear wheelhouse shell 40. The rearward end of the latter is provided with a vertically upwardly oriented folded edge or a corresponding flange structurally joining the extension 28 with the front wall 60 lying behind it in relation to the traveling direction (R). Both the extension 28 and the flange 27 lying to the rear in the traveling direction R can be used in this respect to structurally join the upper wheelhouse shell 20 with the front wall 60 of the motor vehicle body 2.

The assembly sequence for the wheelhouse 5 is sketched on FIG. 5. In a first step, the strut mount 10 is initially guided from below to the lower wheelhouse shell 30, so that its pot section 12 upwardly protrudes through the passage opening 31. In the process, an upper side of the flange section 13 comes to abut against the lower side 30*b* of the lower wheelhouse shell 30. The rear wheelhouse shell 40 is then structurally joined with the assembly included of the lower wheelhouse shell 30 and strut mount 10.

The upper wheelhouse shell 20 is then placed on the assembly formed in this way, wherein the pot section 12 of the strut mount 10 penetrates the passage opening 21 of the upper wheelhouse shell 20 from below here as well. For purposes of assembly, it is provided in particular that the lower side 20*b* of the upper wheelhouse shell 20 lie on the upper side 30*a* of the lower wheelhouse shell 30. In the finally assembled position illustrated on FIG. 6 or FIG. 7, the strut mount 10, in particular its dome- or cup-shaped pot section 12, but at least its cone surface 16, protrudes from one top side 20*a* of the upper wheelhouse shell 20.

The upper and outlying end of the upper wheelhouse shell exhibits an upwardly protruding flange 24, while the upper and outlying end of the lower wheelhouse shell 30 exhibits a downwardly extending flange 34. The flanges 24, 34 oriented in different directions along with the arrangement of the corresponding curvatures 22, 32 spaced apart from the upper wheelhouse shell 20 and lower wheelhouse shell 30 produce a hollow space 72 between the two wheelhouse shells 20, 30 and the wheelhouse brace 50. The latter also has a two-shell design in the present exemplary embodiment. It exhibits an outer wheelhouse brace 52 with roughly a C-shaped design in terms of its cross sectional profile, which is joined with a closed hollow profile by an inner wheelhouse brace 51.

Figure 4:
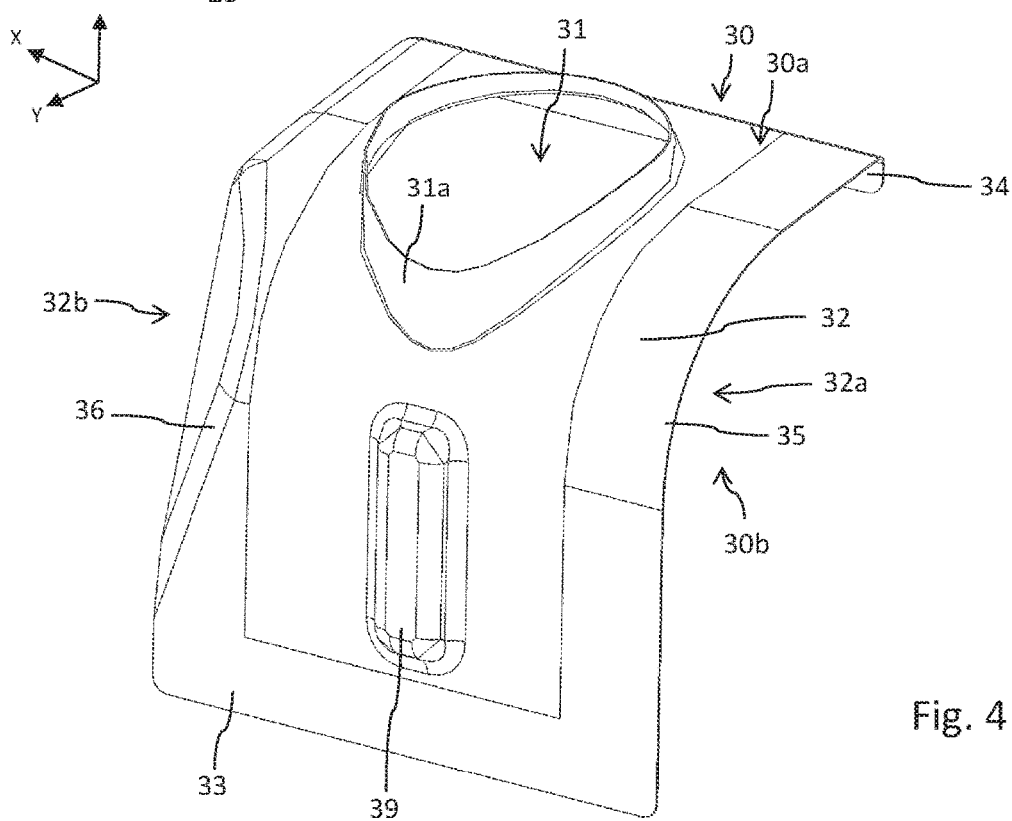
FIG. 4 is an isolated and perspective view of a lower wheelhouse shell.

FIGS. 3 and 4 further show a depression 29 in the curvature 22 of the upper wheelhouse shell 20. Correspondingly thereto, the lower wheelhouse shell 30 exhibits a projection 39 at roughly the same height relative to the depression 29. As a finally assembled position is reached, the projection 39 oriented toward the upper wheelhouse shell 30 and the depression 29 oriented toward the lower wheelhouse shell 30 come to reciprocally abut against each other, so that another stabilizing and structurally stiffening reciprocal attachment of the two wheelhouse shells 20, 30 can be achieved here as well via the several connecting points 8, as shown on FIG. 6.

The double-shell configuration of the wheelhouse 5 quasi provides two tie rods or a so-called two-shear connection for the strut mount 10 on the motor vehicle body 2. This advantageously eliminates the need for otherwise common additional joining means, which in particular contribute to a transverse stabilization of the strut mount 10 or the wheelhouse 5 joined thereto. Therefore, the strut mount 10 does not have to be separately joined with the front wall 60 of the motor vehicle 1, for example with a bulkhead plate. The two strut mounts 10 provided to the left and right in typically the front area also need not be supported against each other by a strut brace. In this respect, the strut mount 10 can be fastened to the motor vehicle body 2 solely and exclusively via the at least two-shell wheelhouse 5. This permits wide-ranging changes to the motor vehicle design and structural composition of the motor vehicle body.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle body comprising:
   a side member; and
   a wheelhouse member supported against the side member, the wheelhouse member including
      an upper wheelhouse shell including a first upwardly protruding continuous flange that forms an opening edge of a first passage opening extending through the upper wheelhouse shell, the upper wheelhouse shell having an upper surface and a lower surface, and
      a lower wheelhouse shell including a second upwardly protruding continuous flange that forms an opening edge of a second passage opening extending through the lower wheelhouse shell,
      wherein the first and second passage openings are arranged coincident to one another to receive a strut mount such that the strut mount extends through the first and second passage openings, beyond the upper surface of the upper wheelhouse shell toward the top in the vehicle vertical direction, and wherein at least portions of the upper wheelhouse shell are joined to the lower wheelhouse shell at connecting points.

2. The motor vehicle body according to claim 1, further comprising the strut mount, wherein the strut mount includes a pot section projecting upwardly in the vehicle vertical direction and a flange surrounding the pot section, wherein the pot section intersects the first and second passage openings from the lower and upper wheelhouse shell from below.

3. The motor vehicle body according to claim 2, wherein the opening edges of the upper and lower wheelhouse shells are joined together with the strut mount.

4. The motor vehicle body according to claim 2, wherein at least one of the flange or the pot section of the strut mount abuts against a lower side of the wheelhouse member and is structurally joined therewith.

5. The motor vehicle body according to claim 1, wherein each of the upper and lower wheelhouse shells exhibit a curvature corresponding to a wheel well contour, and wherein the curvatures of the upper and lower wheelhouse shells form at least one hollow space bordered by the curvatures.

6. The motor vehicle body according to claim 5, wherein the upper wheelhouse shell exhibits a depression in an area of its curvature that extends in the direction toward the lower wheelhouse shell, wherein the depression is joined with the lower wheelhouse shell.

7. The motor vehicle body according to claim 6, wherein the lower wheelhouse shell exhibits a projection in the area of its curvature that extends in the direction toward the upper wheelhouse shell, wherein the projection is joined with the upper wheelhouse shell.

8. The motor vehicle body according to claim 5, wherein the lower wheelhouse shell exhibits a projection in the area of its curvature that extends in the direction toward the upper wheelhouse shell, wherein the projection is joined with the upper wheelhouse shell.

9. The motor vehicle body according to claim 1, further comprising a wheelhouse brace, wherein the upper and lower wheelhouse shells extend upwardly in the vehicle vertical direction from the side member and outwardly in the vehicle transverse direction until bordering the wheelhouse brace.

10. The motor vehicle body according to claim 9, wherein the lower wheelhouse shell is joined with a lateral side of the side member in the vehicle transverse direction.

11. The motor vehicle body according to claim 10, wherein the upper wheelhouse shell is joined with an upper side of the side member in the vehicle vertical direction.

12. The motor vehicle body according to claim 9, wherein the upper wheelhouse shell is joined with an upper side of the side member in the vehicle vertical direction.

13. The motor vehicle body according to claim 1, wherein each of the upper and lower wheelhouse shells have end sections at least partially abutting against each other and structurally joined together.

14. The motor vehicle body according to claim 1, further comprising a rear wheelhouse shell extending from a back portion of the lower wheelhouse shell in relation to the traveling direction of the motor vehicle.

15. The motor vehicle body according to claim 14, wherein the rear wheelhouse shell is configured as a single piece with the lower wheelhouse shell.

16. The motor vehicle body according to claim 14, wherein the rear wheelhouse shell is structurally joined with a terminal section of the lower wheelhouse shell.

17. The motor vehicle body according to claim 14, further comprising a front wall extending in the vehicle transverse direction and in the vehicle vertical direction, wherein the rear wheelhouse shell and upper wheelhouse shell are supported against the front wall in the vehicle longitudinal direction with a flange lying toward the rear in the traveling direction.

18. A motor vehicle with a motor vehicle body according to claim 1.

19. The motor vehicle body according to claim 1, wherein the first and second upwardly protruding continuous flanges abut one another.

* * * * *